United States Patent
Mullis, II et al.

(10) Patent No.: US 9,842,028 B1
(45) Date of Patent: Dec. 12, 2017

(54) PERFORMING STORAGE OBJECT RECOVERY

(71) Applicant: EMC Corporation, Hopkinton, MA (US)

(72) Inventors: Samuel L. Mullis, II, Raleigh, NC (US); Charles Christopher Bailey, Cary, NC (US); Miles Aram DeForest, Bahama, NC (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 14/319,124

(22) Filed: Jun. 30, 2014

(51) Int. Cl.
*G06F 11/14* (2006.01)
*G06F 11/20* (2006.01)
*G06F 11/10* (2006.01)

(52) U.S. Cl.
CPC ...... *G06F 11/1469* (2013.01); *G06F 11/1076* (2013.01); *G06F 11/2094* (2013.01)

(58) Field of Classification Search
CPC ... G06F 11/1456; G06F 11/1471; G06F 11/14
USPC ........................................................ 714/6.12
See application file for complete search history.

(56) References Cited

U.S. PATENT DOCUMENTS

| | | | | |
|---|---|---|---|---|
| 6,810,491 B1 * | 10/2004 | Yamamoto | .......... | G06F 11/2069 714/6.11 |
| 7,386,666 B1 * | 6/2008 | Beauchamp | ........ | G06F 11/2094 711/114 |
| 7,389,379 B1 * | 6/2008 | Goel | .................... | G06F 11/1662 711/112 |
| 8,078,905 B1 * | 12/2011 | Vipul | .................. | G06F 11/1415 714/6.1 |
| 8,185,505 B1 * | 5/2012 | Blitzer | ................ | G06F 11/1458 707/610 |
| 8,214,685 B2 * | 7/2012 | Rosychuk | ........... | G06F 11/1456 714/42 |
| 8,365,185 B2 * | 1/2013 | Bobak | ..................... | H04L 69/40 705/7.27 |
| 8,832,492 B1 * | 9/2014 | Kruck | ................. | G06F 11/1438 709/238 |
| 8,904,229 B1 * | 12/2014 | Veeraswamy | ....... | G06F 11/1446 714/6.2 |
| 8,959,388 B1 * | 2/2015 | Kuang | ................ | G06F 11/0727 714/6.12 |
| 8,959,391 B2 * | 2/2015 | Akirav | ................ | G06F 11/1456 714/4.11 |
| 2011/0154092 A1 * | 6/2011 | Dash | .................... | G06F 11/0709 714/2 |

* cited by examiner

*Primary Examiner* — Kamini Patel
(74) *Attorney, Agent, or Firm* — Krishnendu Gupta; Jason A. Reyes

(57) ABSTRACT

There is disclosed a computer-implemented method, an apparatus, and a computer program product for use in storage object recovery. In one embodiment, the method comprises determining that a storage object requires recovery, wherein the storage object comprises a dedicated recovery area at a fixed location. The method further comprises taking offline the storage object in response to determining that the storage object requires recovery. The method still further comprises performing a recovery procedure to recover the storage object, the recovery procedure utilizing the dedicated recovery area to support storage object recovery.

6 Claims, 9 Drawing Sheets

PERFORMING STORAGE OBJECT RECOVERY

TECHNICAL FIELD

The present invention relates generally to storage object recovery. More specifically, the invention relates to a computer-implemented method, an apparatus, and a computer program product for use in performing storage object recovery by utilizing a dedicated fixed-location recovery area associated with the storage object to support storage object recovery.

BACKGROUND OF THE INVENTION

In general, data storage arrays (herein also referred to as "data storage systems", "disk storage arrays", "disk arrays", or simply "arrays") are called upon to store and manage increasingly larger amounts of data, e.g., in gigabytes, terabytes, petabytes, and beyond. As a result, it is increasingly common or necessary that this large amount of data be distributed across multiple storage devices (e.g., hard disk drives, etc.) or other storage entities.

It will be known that some conventional data storage arrays treat a collection of storage devices as a unified pool of data storage space that is divided into equal sized portions or slices. These data storage arrays can then allocate the slices to logical units. A logical unit can be a subset of a single storage device, e.g., a hard disk drive may contain multiple logical units; a logical unit can be an entire storage device; and a logical unit can span multiple storage devices (e.g., a logical unit may be distributed across multiple storage devices organized into a redundant array of inexpensive disks (RAID) array).

Some of these conventional data storage arrays are also equipped with a recovery program which enables the conventional data storage arrays to recover metadata resulting from corrupted metadata in connection with a storage object (e.g., storage pool, etc.). Along these lines, suppose that corrupted metadata is detected in connection with a storage pool. In this situation, the pool is taken offline and the recovery program is started. For the recovery program to run properly, the recovery program borrows slices from the pool of slices, and then uses the borrowed slices as scratch space to recover the metadata (e.g., the recovery program may apply error checking and error correction algorithms to remaining uncorrupted portions of file system metadata to recreate the metadata). Once the metadata is properly recovered by the recovery program, the recovery program terminates and the borrowed slices are released back to the pool.

It should be understood though that this approach to recovery is not without problems. For example, it is possible for a data storage array to allocate all of the slices of the pool to logical units. In such a situation, suppose that the data storage array then discovers a pool requiring recovery. Unfortunately, since there are no available slices left in the pool for the recovery program to borrow, the recovery program is unable to run, and data recovery fails. That is, the lack of available slices prevents (i.e., starves out) the recovery program from operating, resulting in what may initially only have been a DU situation (i.e., data unavailable situation) being escalated to a DL situation (i.e., data lost situation).

In order to deal with this problem, techniques were introduced in which slices were pre-allocated from the general pool slices to support recovery. With such pre-allocation, there may be an adequate amount of storage to use as scratch space/work space when recovering metadata. However, the pre-allocation of slices does not completely eliminate the chance of a data loss situation. For example, a slice allocation table (SAT) that is used to record information about each slice (e.g., the logical unit that is using the slice, whether the slice is free or allocated, etc.) may become corrupted and allow a slice originally pre-allocated for pool recovery to be handed out to a logical unit.

In light of the above, there is, therefore, a need for other approaches for dealing with recovery.

SUMMARY OF THE INVENTION

There is disclosed a computer-implemented method, comprising: determining that a storage object requires recovery, wherein the storage object comprises a dedicated recovery area at a fixed location; in response to determining that the storage object requires recovery, taking offline the storage object; and performing a recovery procedure to recover the storage object, the recovery procedure utilizing the dedicated recovery area to support storage object recovery.

There is also disclosed an apparatus, comprising: at least one processing device, said at least one processing device comprising a processor coupled to a memory; wherein the apparatus is configured to: determine that a storage object requires recovery, wherein the storage object comprises a dedicated recovery area at a fixed location; in response to determining that the storage object requires recovery, take offline the storage object; and perform a recovery procedure to recover the storage object, the recovery procedure utilizing the dedicated recovery area to support storage object recovery.

There is further disclosed a computer program product having a non-transitory computer-readable medium storing instructions, the instructions, when carried out by one or more processors, causing the one or more processors to perform a method of: determine that a storage object requires recovery, wherein the storage object comprises a dedicated recovery area at a fixed location; in response to determining that the storage object requires recovery, take offline the storage object; and perform a recovery procedure to recover the storage object, the recovery procedure utilizing the dedicated recovery area to support storage object recovery.

BRIEF DESCRIPTION OF THE DRAWINGS

The invention will be more clearly understood from the following description of preferred embodiments thereof, which are given by way of examples only, with reference to the accompanying drawings, in which.

DETAILED DESCRIPTION

Figure 1:
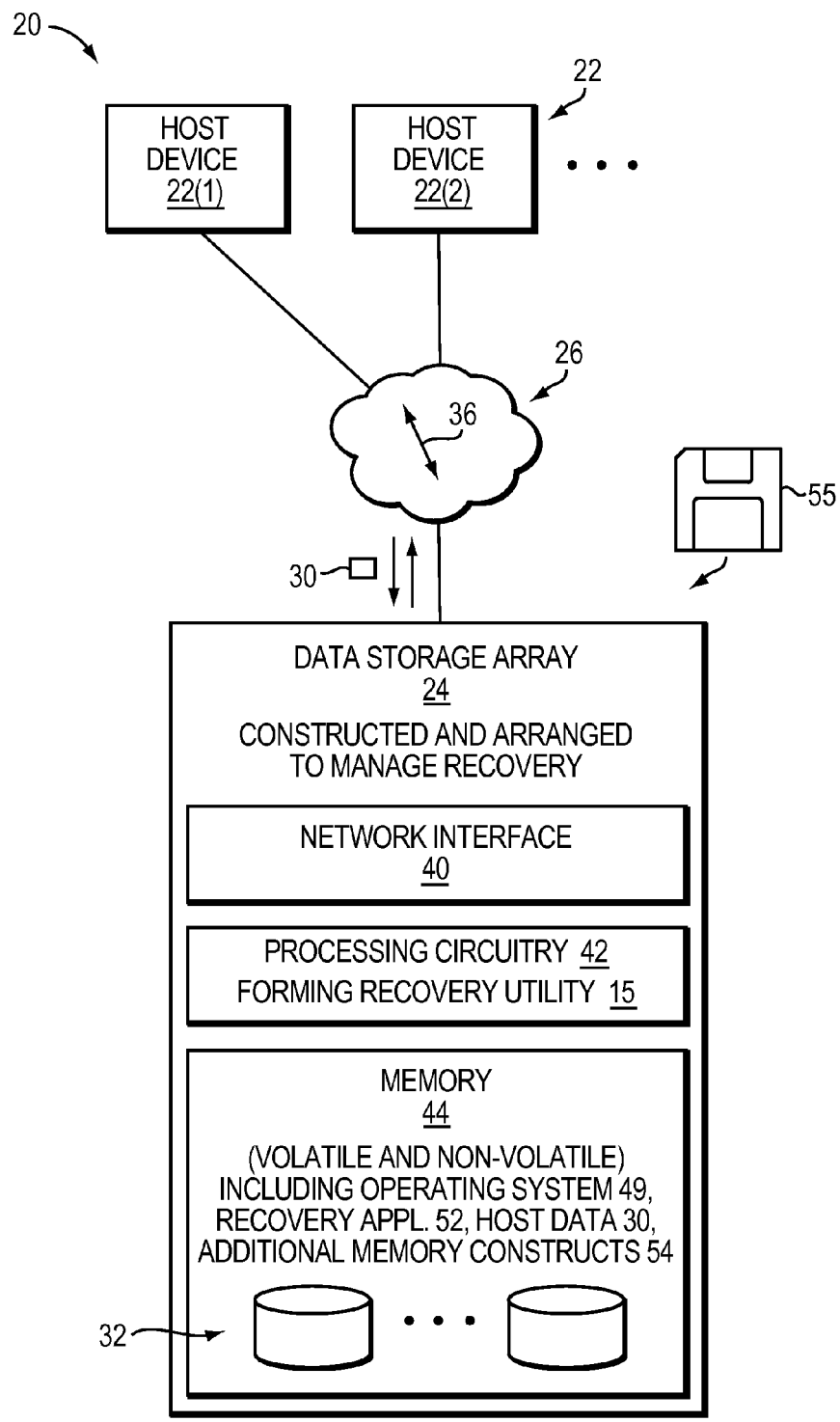
FIG. 1 is a block diagram of a data storage environment having a data storage array which performs storage object recovery.

FIG. 1 illustrates a block diagram of a data storage environment 20 that includes host devices 22(1), 22(2), ... (collectively, host devices 22), a data storage array 24, and communications medium 26.

The host devices 22 are constructed and arranged to store host data 30 into and load host data 30 from the data storage array 24. Along these lines, each host device 22 is capable of providing IO instructions to the data storage array 24 (e.g., read IOs and write IOs in the form of SCSI commands, iSCSI commands, etc.).

The data storage array 24 is constructed and arranged to maintain the host data 30 in non-volatile storage 32 (e.g., solid state drives, magnetic disk drivers, combinations thereof, etc.) by processing the IO instructions from the host devices 22. In particular, the data storage array 24 manages the host data 30 within the non-volatile storage 32 via thin LUN provisioning in which LUN slices are added to thin LUNs (TLUs) on demand (i.e., as new host data 30 is added to the TLUs).

Additionally, the data storage array 24 is further constructed and arranged to perform storage object recovery. For example, the data storage array 24 may discover that metadata in connection with a storage pool has become corrupted. The data storage array 24 can perform storage object recovery in response to discovering the corrupted metadata.

The communications medium 26 connects the various components of the data storage environment 20 together to enable these components to exchange electronic signals 36 (e.g., see the double arrow 36). At least a portion of the communications medium 26 is illustrated as a cloud to indicate that the communications medium 26 is capable of having a variety of different topologies including backbone, hub-and-spoke, loop, irregular, combinations thereof, and so on. Along these lines, the communications medium 26 may include copper-based data communications devices and cabling, fiber optic devices and cabling, wireless devices, combinations thereof, etc. Furthermore, the communications medium 26 is capable of supporting LAN-based communications, SAN-based communications, other protocols, combinations thereof, etc.

As shown in FIG. 1, the data storage array 24 includes a network interface 40, processing circuitry 42, and memory 44. The data storage array 24 may include other components as well, e.g., a user interface or a console port, a service processor, etc.

The network interface 40 is constructed and arranged to connect the data storage array 24 to the communications medium 26. In some arrangements, the network interface 40 is formed by one or more network adaptors or cards. Accordingly, the network interface 40 enables the data storage array 24 to communicate with the other components of the data storage environment 20 such as the host devices 22.

The processing circuitry 42 is constructed and arranged to perform load and store operations (i.e., to process host IOs) on behalf of the host devices 22 as well as various support functions (e.g., backups, security, etc.). In some arrangements, the processing circuitry 42 is formed by one or more storage processors, or directors.

The memory 44 is intended to represent both volatile memory (e.g., DRAM, SRAM, etc.) and non-volatile memory (e.g., flash storage units, magnetic disk drives, etc.). The memory 44 provides primary memory for running software, host data caches, and the non-volatile storage 32 which holds the host data 30. The memory 44 further stores an operating system 49 (e.g., a kernel, drivers, etc.), a recovery application 52, and additional memory constructs (e.g., metadata, user-level applications, and so on).

In some arrangements, the non-volatile storage 32 is tiered based on access speed. For example, the storage 32 may be formed by a first tier of flash memory, a second tier of SAS drives, and a third tier of near line SAS drives.

It should be understood that the processing circuitry 42 can be implemented in a variety of ways including via one or more processors running specialized software, application specific ICs (ASICs), field programmable gate arrays (FPGAs) and associated programs, discrete components, analog circuits, other hardware circuitry, combinations thereof, and so on. In the context of one or more processors running specialized software, a computer program product 55 is capable of delivering all or portions of the software to the data storage array 24. The computer program product 55 has a non-transitory (or non-volatile) computer readable medium which stores a set of instructions which controls one or more operations of the data storage array 24. Examples of suitable computer readable storage media include tangible articles of manufacture and apparatus which store instructions in a non-volatile manner such as CD-ROM, flash memory, disk memory, tape memory, and the like.

During operation, the data storage array 24 performs data storage operations on behalf of the host devices 22. Further, the data storage array 24 is also capable of determining an unhealthy storage object by detecting the unhealthy condition in connection with the storage object (i.e., corrupted metadata in connection with storage object). The data storage array 24 can perform storage object recovery on the unhealthy storage object.

To perform recovery, the processing circuitry 42 runs the recovery application 52 which consumes a small amount of work space. Execution of the recovery application 52 on the processing circuitry 42 forms a recovery utility (or tool) 15. Activation (or launching) of the recovery application 52 can be automatic, e.g., in response to detection by an error checking module of the data storage array 24. Alternatively, the recovery application 52 can be manually invoked, e.g., started by a user responsible for managing the data storage array 24 after receiving a warning message from the data storage array 24. Further details will be provided below.

Figure 2A:
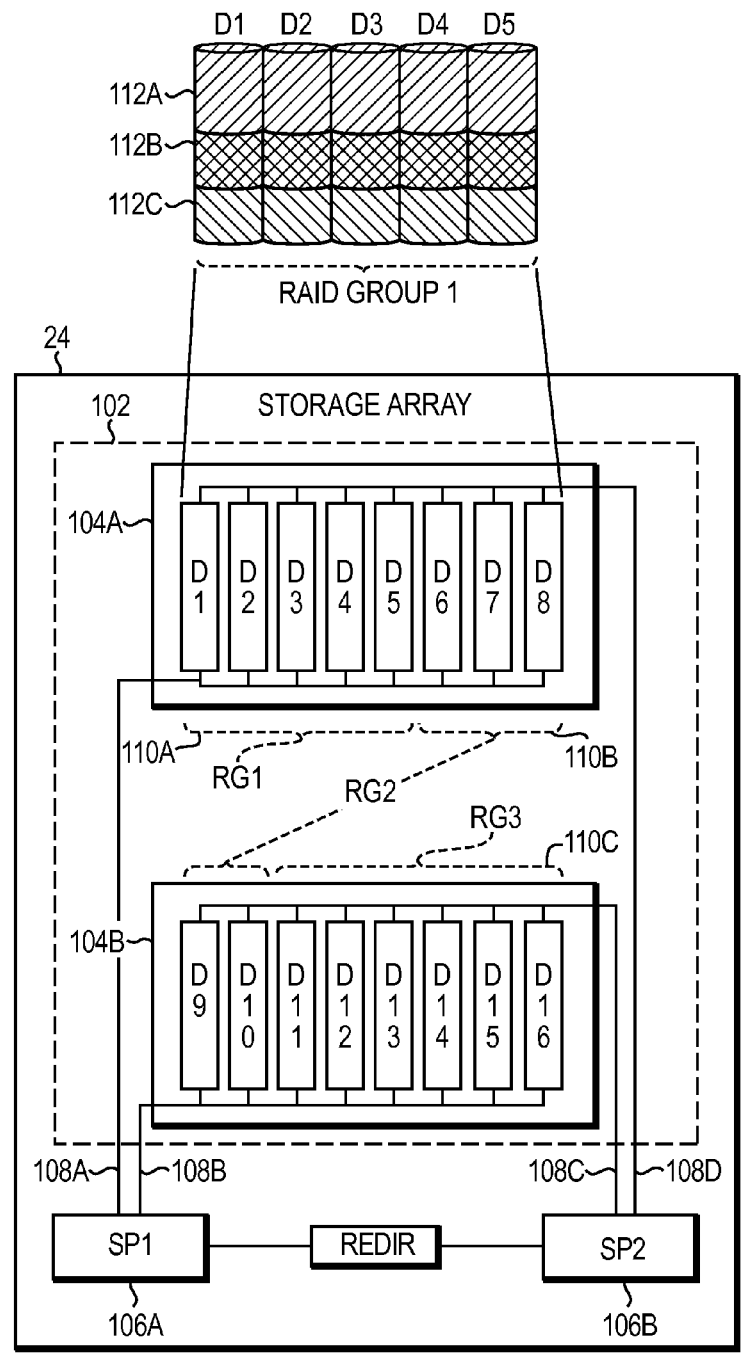
FIGS. 2A and 2B are block diagrams of storage array.

FIG. 2A illustrates an example of a storage array 24 that includes multiple storage devices 102, which are typically hard disk drives, but which may be tape drives, flash memory, flash drives, other solid state drives, or some combination of the above. Storage devices 102 may have various differences in capabilities based on physical characteristics of underlying storage media, e.g., flash memory may be extremely fast compared to tape storage which may be relatively large and cheap. As used herein, storage media may also be referred to as physical media. Storage media may include any of various computer readable media, e.g., hard disks, floppy disks, disks, tapes, discs, solid state memory, optical discs, and flash memory. In at least one embodiment, storage devices 102 may be organized into tiers or classes of storage based on characteristics of associated storage media. For example, flash-based storage device 102 may be tier 1 storage, hard disk-based storage device 102 may be tier 2 storage, and tape-based storage devices 102 may be tier 3 storage.

In at least one embodiment, the storage devices may be organized into multiple shelves 104, each shelf containing multiple devices 102. In the embodiment illustrated in FIG.

2A, storage array 24 includes two shelves, Shelf1 104A and Shelf2 104B; Shelf1 104A contains eight storage devices, D1-D8, and Shelf2 also contains eight storage devices, D9-D16. Storage array 24 may include one or more storage processors 106, for handling input/output (I/O) requests and allocations. Each storage processor 106 may communicate with storage devices 102 through one or more data buses 108. In at least one embodiment, storage array 24 contains two storage processors, SP1 106A, and SP2 106B, and each storage processor 106 has a dedicated data bus 108 for each shelf 104. For example, SP1 106A is connected to each storage device 102 on Shelf1 104A via a first data bus 108A and to each storage device 102 on Shelf2 104B via a second data bus 108B. SP2 106 is connected to each storage device 102 on Shelf1 104A via a third data bus 108C and to each storage device 102 on Shelf2 104B via a fourth data bus 108D. In this manner, each device 102 is configured to be connected to two separate data buses 108, one to each storage processor 106. For example, storage devices D1-D8 may be connected to data buses 108A and 108C, while storage devices D9-D16 may be connected to data buses 108B and 108D. Thus, each device 102 is connected via some data bus to both SP1 106A and SP2 106B. The configuration of storage array 24, as illustrated in FIG. 2A, is for illustrative purposes only, and is not considered a limitation of the current technique described herein.

In addition to the physical configuration, storage devices 102 may also be logically configured. For example, multiple storage devices 102 may be organized into redundant array of inexpensive disks (RAID) groups, or RGs 110, shown in FIG. 2A as RG1 110A, RG2 110B, and RG3 110C. Storage devices D1-D5 are organized into a first RAID group, RG1 110A, while storage devices D6-D10 are organized into a second RAID group, RG2 110B. Storage devices D11-D16 are organized into a third RAID group, RG3 110C. In at least one embodiment, a RAID group may span multiple shelves and/or multiple buses. For example, RG2 110B includes storage devices from both Shelf1 104A and Shelf2 104B.

Although RAID groups are composed of multiple storage devices, a RAID group may be conceptually treated as if it were a single storage device. As used herein, the term "storage entity" may refer to either a single storage device or a RAID group operating as a single storage device. RAID groups (RG) may be created or based on a various factors, including proximity of storage devices, utilization goals, capacity needs, physical characteristics of storage devices 102, and other factors. In at least one embodiment, RGs are based on tiers generally determined by physical characteristics of storage devices (e.g., fast, high quality devices D1-D5 may be tier 1 storage devices, and, as such, may be organized into a given RG 110). Such physical characteristics of storage devices for determining tiers may include but is not limited to capacity of storage device, access speed of storage device (e.g., revolution per minute (RPM) for disk-based media and throughput for solid state media), and type of storage device (e.g., flash, hard disk, and floppy). Further a RAID group may also include storage devices (e.g., disk drives) that are configured from different storage tiers.

In this embodiment illustrated in FIG. 2A, RG1, which includes storage devices D1-D5, is sub-divided into 3 private LUs, LU1, LU2, and LU3. Each private LU is further subdivided into portions, referred to as "slices". Slices may be any size and may be associated with storage media from one or more storage entities. In at least one embodiment, slices are constant-sized portions of storage associated with one storage device 102, or a storage media therein, in storage array 12 (e.g., a 1 gigabyte (GB) slice from D2). A user may not access LU1, LU2, and LU3 as the LUs are private LUs. However, a user may access a mapped LU which is created from slices of private LUs as described below herein. A mapped LU may also be referred to as a front end logical unit such that a user may allocate the mapped LU for provisioning storage.

Figure 2B:
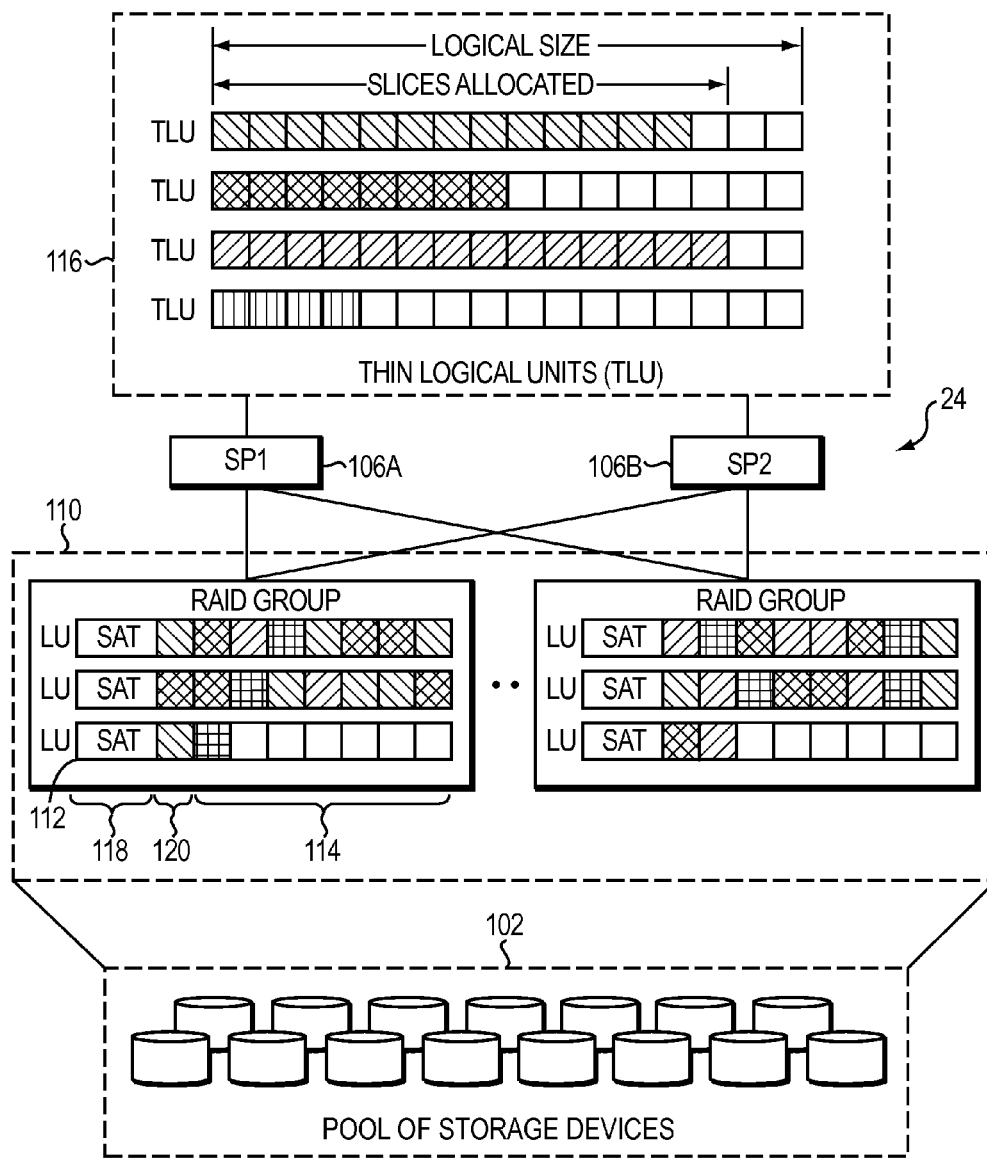

FIG. 2B illustrates a block diagram of another view of data storage array 24. In the simplified view shown in FIG. 2B, a pool of storage devices 102 are organized into multiple RAID groups 110, and each RAID group is further divided into a number of LUs from which slices 114 are allocated to one or more mapped LUs for use by users of storage array 12. As used herein, a mapped LU refers to a logical portion of storage space that represent contiguous and/or non-contiguous physical storage space, where mapping allows for physical storage space to be dynamically linked together at a time of use into a logically contiguous address space. Exemplary examples of mapped LUs may include thin logical units (TLUs) 116 and direct logical units (DLUs). A thin logical unit ("TLU") is a sparsely populated logical unit (LU) provisioned at creation but which is not allocated any storage until the storage is actually needed. A "direct logical unit" or "DLU" (also referred to as "direct mapped LUN") is a fully provisioned mapped LU with coarse mapping. Even though a DLU is seen as fully provisioned by a user, internally storage space is allocated on an as-needed basis. TLUs 116 may have a logical size that is larger than the actual storage size consumed by TLUs 116. The actual consumed size is determined by the number of slices actually allocated to the TLU 116. Thus, an amount of storage space presented to a host of a data storage system using a thin logical volume may be different than the amount of storage space actually allocated to the thin logical volume. The slices that are allocated to a mapped LUN may be physically located anywhere in storage array 100. These slices may be located more or less contiguously, but they may also be distributed more or less evenly across all physical resources, depending on the slice selection and allocation policy or algorithm. Other physical distributions are within the scope of the current technique claimed herein.

Figure 3:
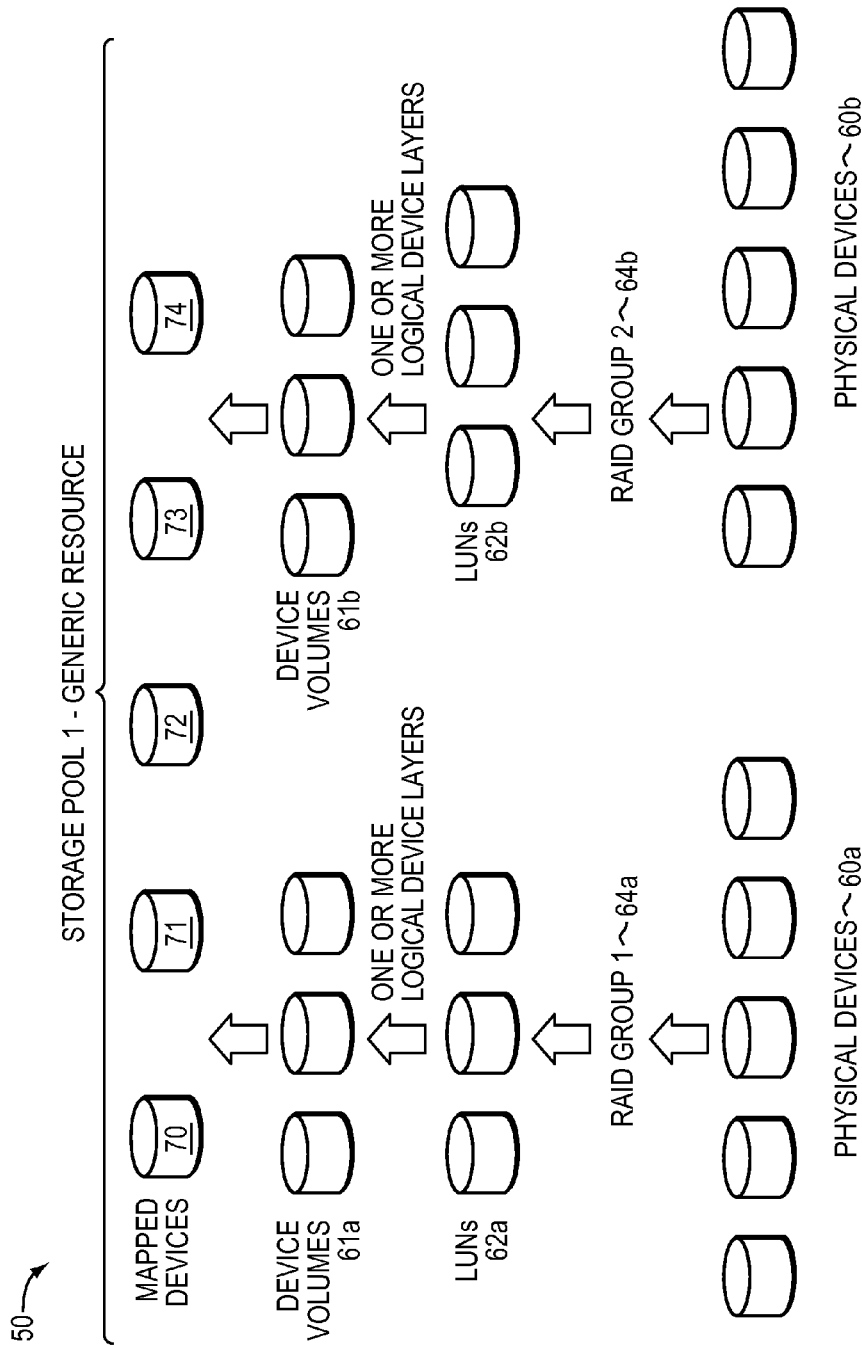
FIG. 3 is a block diagram of storage device layout.

In at least one embodiment, storage processors 106A, 106B are responsible for allocating storage and maintaining information about how that allocated storage is being used. In one implementation of storage array 24, each logical unit 112 is associated with a slice allocation table (SAT) 118, which is used to record information about each slice 114, such as the TLU that is using the slice 114 and whether the slice is free or allocated. The SAT 118 may be stored in the logical unit 112, or it may be stored outside the logical unit 112 to which it is associated. Each logical unit 112 also comprises a scratch space 120 as will be described further below FIG. 3 illustrates an example representing how data storage array best practices may be used to form storage pools. The example 50 illustrates how storage pools may be constructed from groups of physical devices. For example, RAID Group1 64a may be formed from physical devices 60a. The best practices of a policy may specify the particular disks and configuration for the type of storage pool being formed. For example, for physical devices 60a on a first data storage array type when forming a storage pool, RAID-5 may be used in a 4+1 configuration (e.g., 4 data drives and 1 parity drive). The RAID Group 1 64a may provide a number of data storage LUNs 62a. An embodiment may also utilize one or more additional logical device layers on top of the LUNs 62a to form one or more logical device volumes 61a. The particular additional logical device layers used, if any, may vary with the data storage system. It should be noted that there may not be a 1-1 correspondence between the LUNs of 62a and the volumes of 61a. In a similar manner, device volumes 61b may be formed or configured from physical devices 60b. The storage pool 1 of the example 50 illustrates two RAID groups being used to define a single storage pool although, more generally, one or more RAID groups may be used to form a storage pool in an embodiment using RAID techniques.

The data storage array 24 may also include one or more mapped devices 70-74. A mapped device (e.g., "thin logical unit", "direct logical unit") presents a logical storage space to one or more applications running on a host where different portions of the logical storage space may or may not have corresponding physical storage space associated therewith. However, the mapped device is not mapped directly to physical storage space. Instead, portions of the mapped storage device for which physical storage space exists are mapped to data devices such as device volumes 61a-61b, which are logical devices that map logical storage space of the data device to physical storage space on the physical devices 60a-60b. Thus, an access of the logical storage space of the mapped device results in either a null pointer (or equivalent) indicating that no corresponding physical storage space has yet been allocated, or results in a reference to a data device which in turn references the underlying physical storage space.

Figure 4:
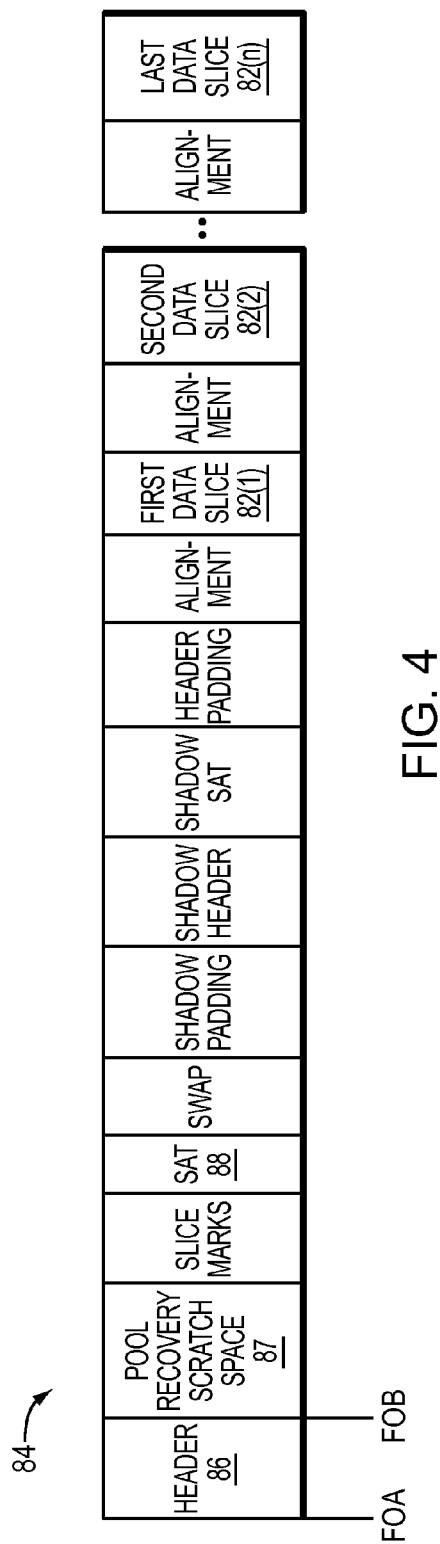
FIG. 4 is a block diagram of a type of logical unit.

FIG. 4 illustrates a logical unit or partition which is a large contiguous portion of memory formed by the non-volatile storage (e.g., LUN 112 in FIG. 2B). Such partitioning may be used by the operating system 49 to manage particular aspects of the data storage array 24 (e.g., for data management, for RAID groups, etc.). An example of a system which works in a manner similar to that described above is the Flare® system which uses Flare LUNs (FLUs), and which is provided by EMC Corporation of Hopkinton, Mass.

As further shown in FIG. 4, the storage partition 84 includes a partition header 86, a scratch space 87 (e.g., scratch space 120 in FIG. 2B), a slice allocation table 88 (e.g., SAT 118 in FIG. 2B) and a series of slices 82 (e.g., slices 114 in FIG. 2B). For example, the storage partition 84 includes slices 82(1)(1), 82(1)(2), . . . 82(1)(N), where N is a positive integer. It should be understood that the slices 82 of the partition 84 are of a predefined size (e.g., 1 GB, 512 MB, 256 MB, etc.), and can be referenced via the header 86 of that partition 84. The FOA, or fixed offset A, indicates the fixed location on the logical unit where the header starts. The scratch space 87 is a dedicated storage area exclusively for recovery. The FOB, or fixed offset B, indicates the fixed location on the logical unit where the scratch recovery section starts. In one implementation of the storage array 24, the logical unit 84 is associated with the slice allocation table (SAT) 88, which is used to record information about each slice 82, such as whether the slice is free or allocated and, if it is allocated, to which slice owning entity.

Figure 5:
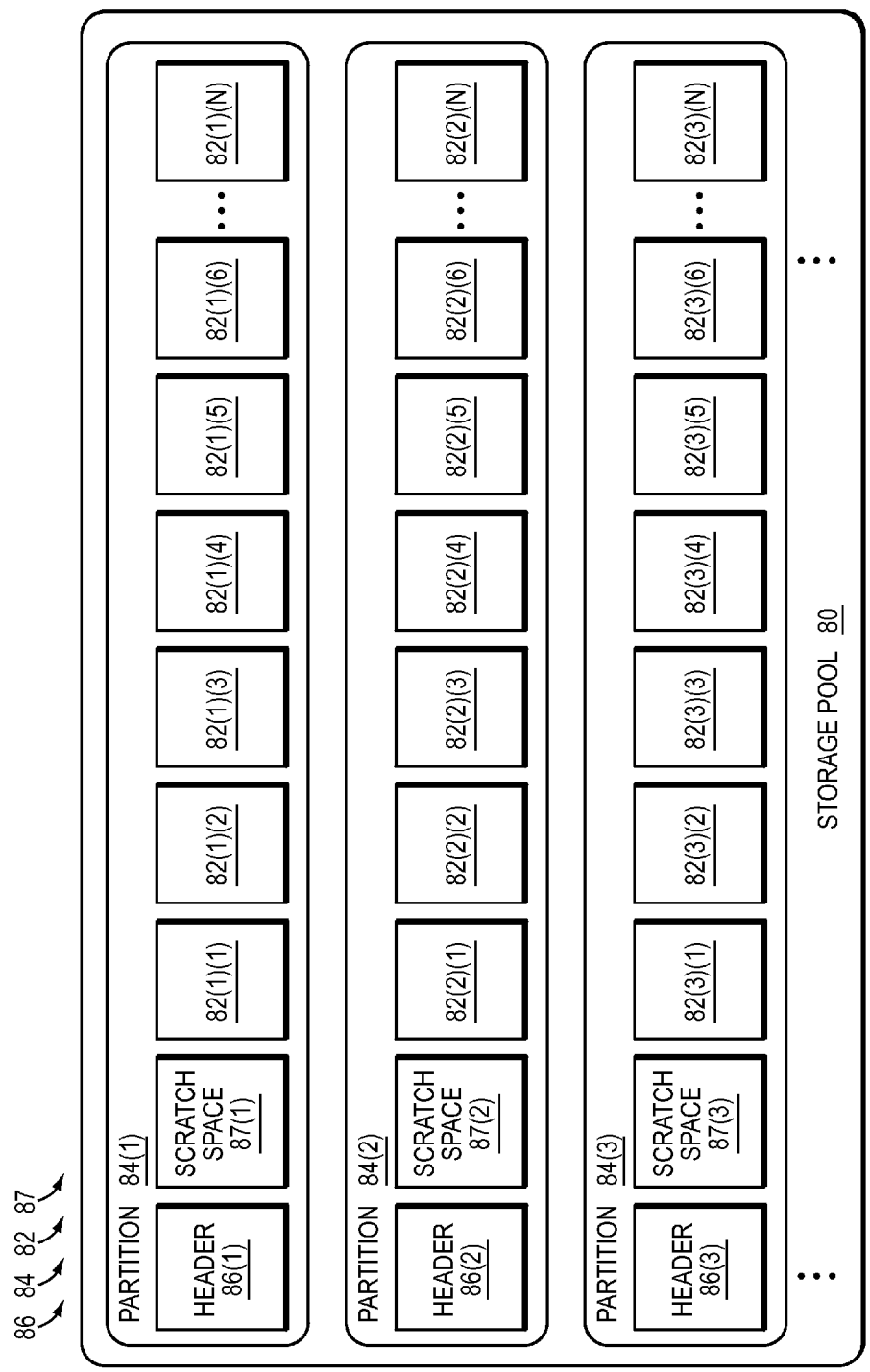
FIG. 5 is a block diagram of a slice storage pool at a first time.
Figure 6:
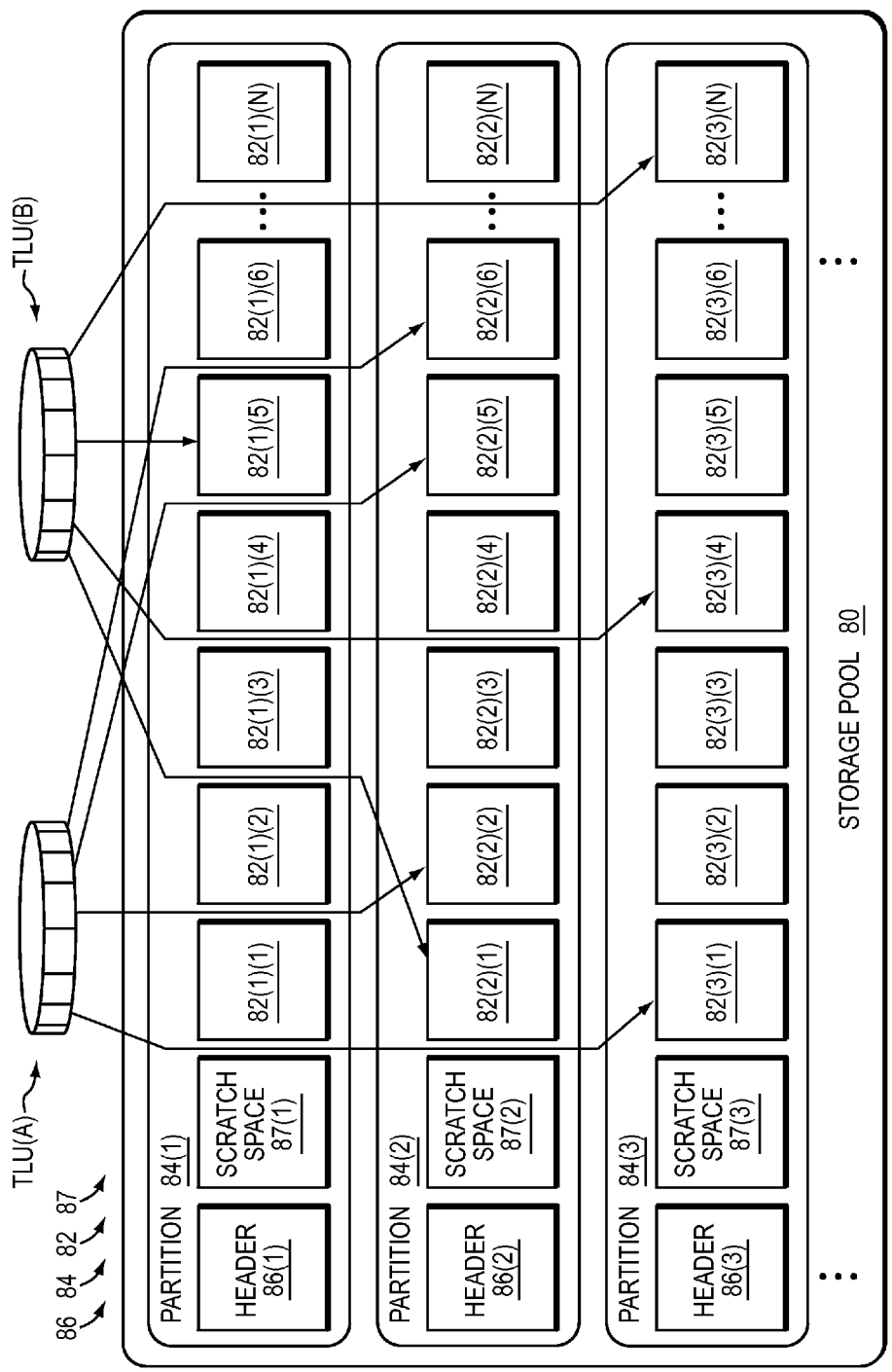
FIG. 6 is a block diagram of the slice storage pool at a second time.
Figure 7:
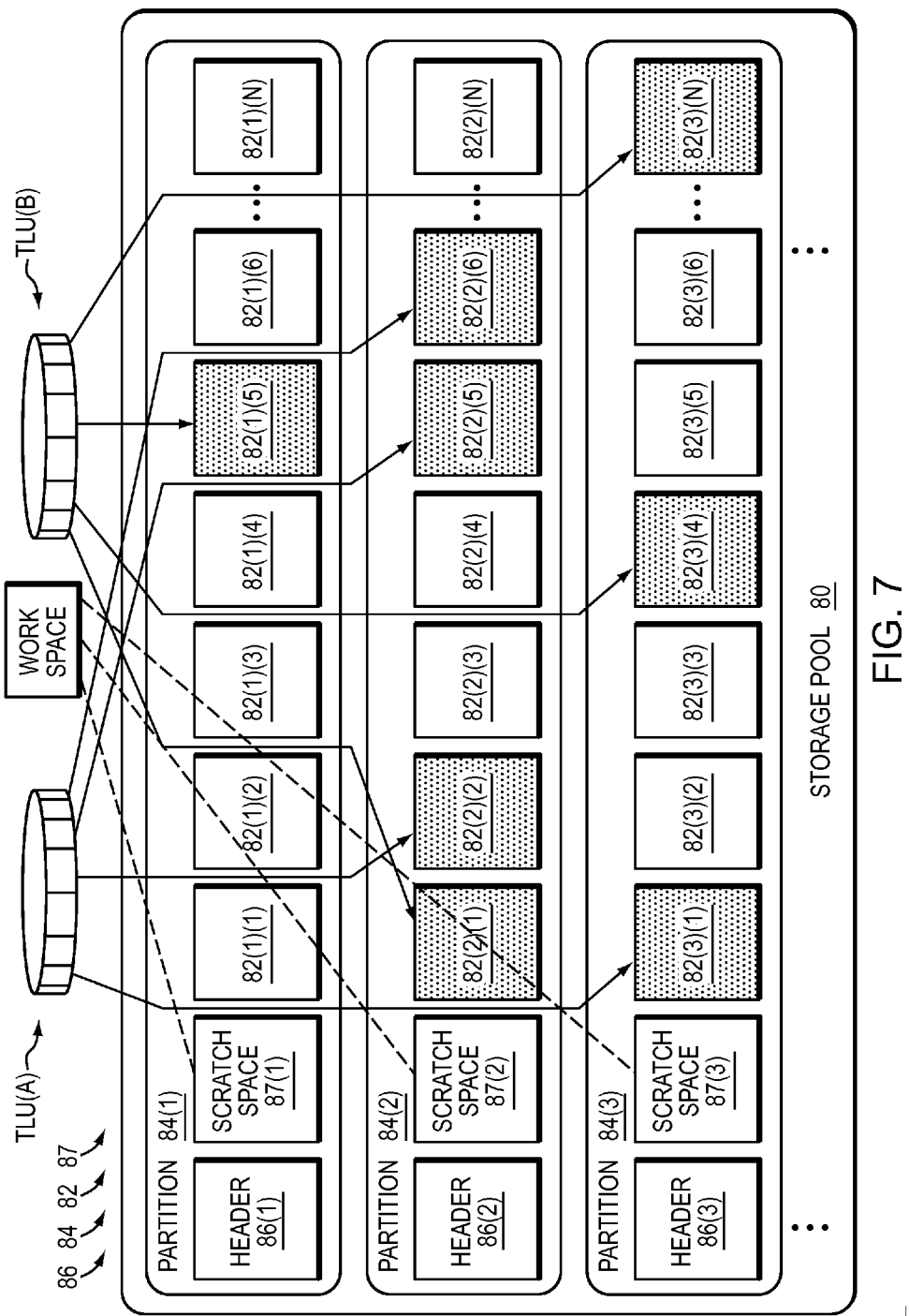
FIG. 7 is a block diagram of the slice storage pool at a third time.

FIGS. 5 through 7 illustrate a storage object, which in this embodiment is a storage pool 80, at various times of data storage array operation (also see FIG. 1). FIG. 5 shows the storage pool 80 at an initial time before any TLUs consume LUN slices 82. FIG. 6 shows the storage pool 80 at a second time (after the initial time) when the data storage array 24 maintains TLUs which consume slices 82. FIG. 7 shows the storage pool 80 at a third time when the data storage array 24 performs recovery using scratch space 87 to recover an unhealthy pool. Pool level recovery recovers the metadata associated with the pool level assignment of slices.

As discussed above, and further shown in FIG. 5, the storage partition 84 includes a partition header 86, a scratch space 87 and a series of LUN slices 82. It should be appreciated that some other features have been omitted from FIG. 5 simply for ease of illustration. For example, the storage partition 84(1) includes partition header 86(1), a scratch space 87(1) and a series of LUN slices 82(1)(1), 82(1)(2), . . . 82(1)(N), where N is a positive integer. Similarly, the storage partition 84(2) includes another partition header 86(2), a scratch space 87(2) and another series of LUN slices 82(2)(1), 82(2)(2), . . . 82(2)(N), and so on.

It should be appreciated that the data storage array 24 operates to manage host data 30 on behalf of host devices 22 (also see FIG. 1). Along these lines, the processing circuitry 42 allocates available (or free) slices 82 from the storage pool 80 to TLUs and stores host data 30 in the allocated slices 82. Such consumption of available slices 82 may occur incrementally (e.g., as the host devices 22 write new host data 30 to the data storage array 24 over time thus growing the TLUs in an on demand manner), or via migration (e.g., as host data 30 is copied from one data storage array 24 to another), combinations thereof, etc.

By way of example and as shown in FIG. 6, the data storage array 24 stores two TLUs to support storage of two file systems, i.e., TLU(A) and TLU(B). In particular, TLU (A) includes LUN slices 82(3)(1), 82(2)(2), 82(2)(5), and 82(2)(6) storing host data 30 for a first file system. Additionally, TLU(B) includes slices 82(2)(1), 82(3)(4), 82(1)(5) and 82(3)(N) storing host data 30 for a second file system. As shown, the slices 82 for a particular TLU may reside across multiple partitions 84.

It should be understood that modifications to the host data 30 stored within the slices 82 of the TLUs results in overwriting of earlier-stored host data 30 with new host data 30 by the processing circuitry 42. Furthermore, addition of new host data 30 to a particular TLU results in adding, by the processing circuitry 42, one or more slices 82 to that TLU to store the new host data 30.

Various mechanisms are suitable for controlling allocation of the slices 82. In some arrangements, the processing circuitry 42 manages allocation of slices 82 via slice allocation table or similar data structure.

Now, suppose that the processing circuitry 42 discovers that a particular pool has corrupted metadata and that the recovery application 52 is invoked. In this situation, the recovery utility 15 utilizes the scratch space 87. In particular, the recovery utility 15 takes the pool offline (i.e., prevents the host devices 22 from accessing the unhealthy pool), and consumes scratch space 87. The recovery utility 15 then performs error checking and correction operations to recover the corrupted data. For example, as shown in FIG. 7, scratch space 87 may be consumed by the recovery utility 15, and used as work space for pool recovery (e.g., temporary scratch space for data correction/reconstruction operations).

In the example of FIG. 7, some or all of the scratch space 87 may be used for recovery of pool 80. Accordingly, such an arrangement guarantees that the recovery utility 15 has space at a fixed location in order to properly run and perform recovery of the corrupted pool. The scratch space 87 is not available for allocation to a TLU to store new host data 30.

Once recovery is complete, the scratch space 87 remains dedicated exclusively for recovery and thus cannot be allocated to any TLUs for storage of new host data 30. Furthermore, the recovered pool may be moved back online so that a host device 22 can again read host data 30 from and write host data 30 to the pool.

Figure 8:
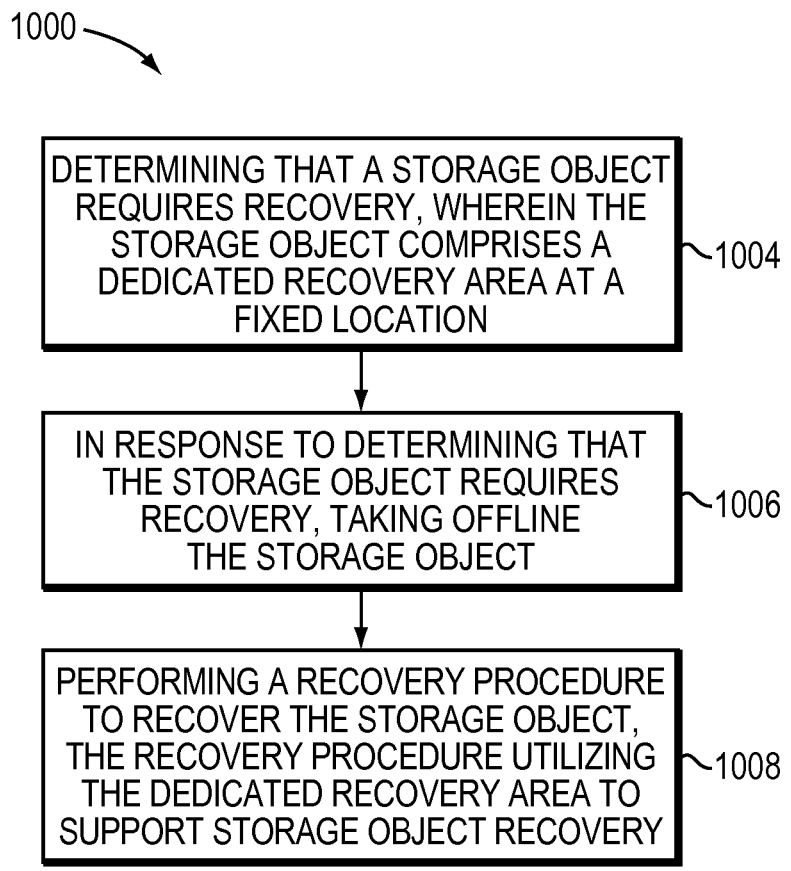
FIG. 8 is a flowchart of a procedure which is performed by data storage array.

FIG. 8 illustrates a flowchart of a procedure 1000 which is performed by the data storage array 24. In step 1004, the data storage array 24 determines that a storage object requires recovery by detecting corrupted metadata in connection with the storage object. For example, the storage object may be a storage pool comprising a logical unit having a plurality of data slices and a recovery area. As discussed above, the plurality of data slices are suitable for storing host data. However, the recovery area is a dedicated recovery area located at a fixed location that comprises a plurality of recovery slices not available for storing host data. The recovery area is dedicated exclusively for recovery. In step 1006, the data storage array 24 takes offline the storage object in response to determining that the storage object requires recovery. In step 1008, the data storage array 24 performs, while the storage object is offline, storage object recovery to recover the storage object. In particular, the recovery utility 15 formed by the processing circuitry 42 running the recovery application 52 (FIG. 1) performs a recovery procedure to recover corrupted data (e.g., incorrect bits of metadata, etc.). Such recovery utilizes the dedicated recovery area to support recovery.

Advantageously, the data storage array 24 completely segregates the storage that can be used for pool recovery. The data storage array 24 stores pool recovery slices at a well-known location. It should be appreciated that the SAT does not contain the recovery slices. Because the number of required pool storage slices is directly related to the size of the pool it is possible to pre-calculate the required storage when an internal LU is formatted. This quantity is computed from the physical size of the LU. Since the physical size of the LU is not affected by the slice-allocation structures, recovery space is reliably reserved within the pool.

As discussed above, it should be understood that the scratch space is at a fixed well-known address of the internal LU. Further, the size of the scratch area is based solely on the size of the LU. The location and number of slices is always deterministic and does not require any persistent metadata (which could be corrupted) to exist. Moreover, since space is reserved for each component LU of the pool in a quantity proportional to the LU size, recovery storage automatically adjusts as the pool expands and shrinks.

Additionally, it should be understood that the version of the size calculation or the size of the recovery area can be persistently stored in a separate area from the slices themselves. As a result, the size computation can be changed between software releases, and compatibility can be maintained with those pools created with an earlier version of the size calculation.

While various embodiments of the present disclosure have been particularly shown and described, it will be understood by those skilled in the art that various changes in form and details may be made therein without departing from the spirit and scope of the present disclosure as defined by the appended claims.

What is claimed is:

1. A computer-implemented method, comprising:
allocating a scratch space to support recovery of a storage pool, wherein the storage pool comprises a set of allocatable slices and the scratch space is distinct with respect to the set of allocatable slices such that a slice allocator for allocating slices from the storage pool is unaware of the existence of the scratch space;
after at least a portion of the set of slices have been allocated, taking offline the storage pool for facilitating recovery of the storage pool; and
while the storage pool is offline, performing a storage pool recovery procedure to recover the storage pool, the storage pool recovery procedure utilizing the scratch space that was allocated to support the storage pool recovery.

2. The method as claimed in claim 1, further comprising:
moving the storage pool online upon completion of the recovery procedure.

3. An apparatus, comprising:
at least one processing device, said at least one processing device comprising a processor coupled to a memory:
wherein the apparatus is configured to:
allocate a scratch space to support recovery of a storage pool, wherein the storage pool comprises a set of allocatable slices and the scratch space is distinct with respect to the set of allocatable slices such that a slice allocator for allocating slices from the storage pool is unaware of the existence of the scratch space;
after at least a portion of the set of slices have been allocated, take offline the storage pool for facilitating recovery of the storage pool; and
while the storage pool is offline, perform a storage pool recovery procedure to recover the storage pool, the storage pool recovery procedure utilizing the scratch space that was allocated to support the storage pool recovery.

4. The apparatus as claimed in claim 3, wherein the apparatus is further configured to:
move the storage pool online upon completion of the recovery procedure.

5. A computer program product having a non-transitory computer-readable medium storing instructions, the instructions, when carried out by one or more processors, causing the one or more processors to perform a method of:
allocating a scratch space to support recovery of a storage pool, wherein the storage pool comprises a set of allocatable slices and the scratch space is distinct with respect to the set of allocatable slices such that a slice allocator for allocating slices from the storage pool is unaware of the existence of the scratch space;
after at least a portion of the set of slices have been allocated, taking offline the storage pool for facilitating recovery of the storage pool; and
while the storage pool is offline, performing a storage pool recovery procedure to recover the storage pool, the storage pool recovery procedure utilizing the scratch space that was allocated to support the storage pool recovery.

6. The computer program product as claimed in claim 5, the computer program product further stores instructions, the instructions, when carried out by one or more processors, causing the one or more processors to further perform a method of:
moving the storage pool online upon completion of the recovery procedure.

* * * * *